Sept. 26, 1961  F. D. JONES  3,001,527
CORN HARVESTER ROLLS
Filed Oct. 13, 1958
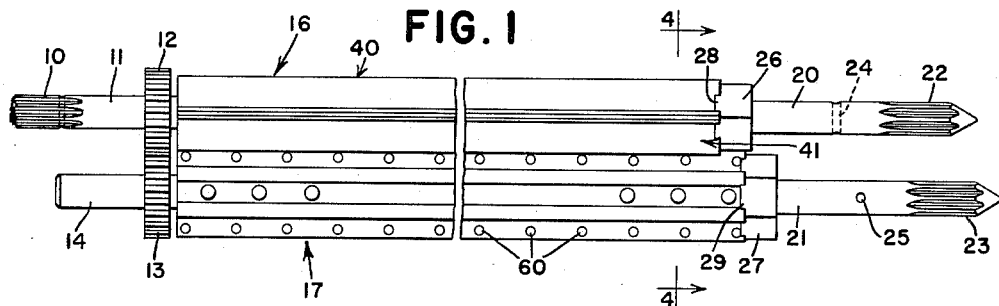
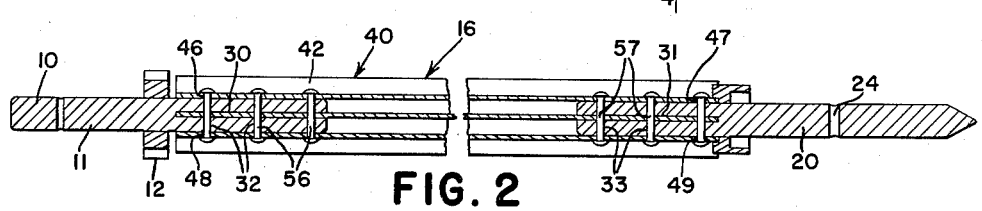
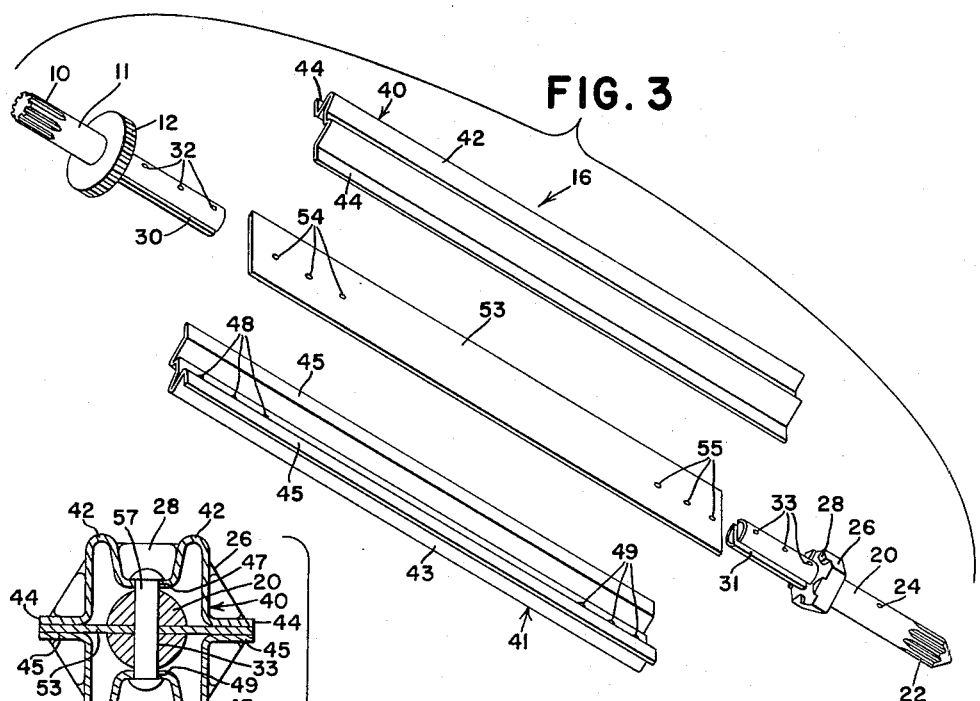
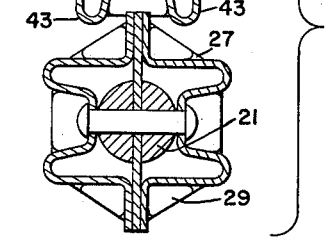
INVENTOR.
F. D. JONES
BY
ATTORNEYS

United States Patent Office 3,001,527
Patented Sept. 26, 1961

3,001,527
CORN HARVESTER ROLLS
Frank D. Jones, Moline, Ill., assignor to Deere & Company, Moline, Ill., a corporation of Delaware
Filed Oct. 13, 1958, Ser. No. 766,829
5 Claims. (Cl. 130—5)

This invention relates to an improved type of snapping or harvesting rolls commonly used in a corn harvester. More particularly this invention relates to the construction of the harvesting rolls.

The common method of building harvesting rolls is by casting. The conventional type of rolls normally consist of an elongated core having various types of lugs or corrugations on its surface which contact the stalks of corn. The harvesting rolls are normally positioned in a harvester in pairs and are so positioned to form a stalk passage which permits the stalks in the row of corn to pass between the rolls. The roughened surface of the rolls tend, upon rotation of the rolls, to engage the stalks and to draw the stalks downwardly until the ears on the stalks contact the rolls at which time the ears will be detached or "snapped" from the stalks.

There have been various attempts to fabricate snapping rolls from metal sheets. However, in most instances, the fabricated part of the rolls are mounted over a solid core and consequently the fabricated portion is only a substitute for the roughened surface of the conventional type roll. In the previous attempts to manufacture the snapping rolls by fabrication, the central core was needed to provide strength for the fabricated portions of the roll.

It is therefore a primary object of the invention to provide a fabricated roll made of various parts, each part of which affords support for the other parts and in effect creates a completely fabricated snapping roll.

It is still a further object of the present invention to provide a fabricated snapping roll of the above type having axial ribs or corrugations and which operates in conjunction with a second roll to form the pair of snapping rolls and is so positioned to accommodate the high and low portions of the ribs on the adjacent roll.

Other objects and advantages of the invention will become apparent to those skilled in the art as the nature of the invention is better understood from the following description and as shown in the accompanying drawings:

FIG. 1 is a plan view of a pair of harvesting rolls.

FIG. 2 is a vertical sectional view of one of the snapping rolls.

FIG. 3 is an exploded view of the snapping roll.

FIG. 4 is an enlarged sectional view taken substantially along the line 4—4 of FIG. 1.

Snapping, husking, or similar type of harvesting rolls normally operate in pairs and consequently the present invention is shown in relation to a pair of rolls. However, the rolls are identical with slight exception, which shall be specifically mentioned, and consequently a general description shall be limited to only one of the rolls and the same reference numerals will be used for identical parts of each roll.

The snapping rolls are normally positioned in fore-and-aft relation to the direction of travel of the harvester. The snapping rolls are driven from their rear end by power means, not shown, but which engages a splined end 10 of a stub or support shaft 11. Fixed to the stub shaft 11 is a pinion 12 which engages a gear 13 fixed to a splined or support shaft 14 of an adjacent roll. The snapping or harvesting rolls will be referred in their entirety by the reference numerals 16, 17.

At the forward ends of the snapping rolls 16, 17 is a pair of stub or support shafts 20, 21 respectively. The shafts 20, 21 are splined at their forward ends at 22, 23 respectively for insertion into forward driven structure, not shown. Provision is made at 24, 25 for pins, also not shown, which are also used to mount the forward support shafts 20, 21. However, details of the splines at 10, 22, and 23 as well as the pin openings 24, 25 serve no purpose as far as the present invention is concerned, and only are described for purposes of orientation. It should be recognized that other forms of drive and mounting would be as effective depending upon the type of drive and harvester in which they are used. Mounted also on the stub shafts 20, 21 are a pair of end plugs 26, 27, having rearwardly extending lug portions 28, 29 respectively which fit into and may be inserted to accommodate the front portions of the snapping rolls 16, 17 in a manner later to be explained.

Shown clearly in FIGS. 2 and 3 are the forward portion of the shaft 11 and the rear portion of the shaft 20. As may be seen, the shafts are spaced apart, are coextensive axially, and are provided with diametrical slots 30, 31 respectively and a series of rivet receiving openings 32, 33, respectively. A similar construction is provided for the shafts 14, 21, but as previously mentioned description shall be limited only to the snapping roll 16.

The outer or peripheral portion of the snapping roll 16 is composed of a pair of elongated shell members 40, 41 formed of corrugated sheet metal construction. The corrugations provide longitudinal ribs as at 42, 43 and are terminated in outwardly extending edge flanges 44, 45 respectively. As may clearly be seen from the drawings, each of the elongated members 40, 41 form half of the peripheral shell of the snapping roll 16. The sections 40, 41 are also provided with rivet receiving openings at opposite ends and in the lands between the corrugations, the openings being indicated by the reference numerals 46, 47 on the section 40, and 48, 49 on the section 41. The rivet receiving openings 46—49 are registrable with the rivet receiving openings 32, 33 in the stub or support shafts 11, 20, respectively.

Provided between the sections 40, 41 is an elongated plate portion 53 formed also of sheet metal and substantially of the same length as the shell members 40, 41. The plate portion 53 has diametrical opposite longitudinal edges lying between and adjacent the flanges 44, 45. The plate 53 is also provided with rivet openings 54, 55 at its opposite ends which are registrable with the rivet openings 32, 33 and 46—49. In assembly, the plate 53 lies in a plane containing the axis of shafts 11, 20 and has opposite ends inserted in the slots 30, 31 to a position in which the rivet openings 54, 55 are alined with the rivet openings 32, 33. The shell sections 40, 41 are positioned as shown in FIG. 4 and rivets 56, 57 are driven through the rivet openings in their alined positions. Not shown relative to the snapping roll 16 but clearly indicated in the plan view in FIG. 1 of the snapping roll 17 are a series of spot welds 60 which rigidly unite the flanges 44 and 45 and plate member 53 to one another. The end plug 26 has its axially extending insert portions 28, 29 inserted between the ribs 42, 43 and flanges 44, 45 of the assembled roll, thus affording additional strength at that end of the roll.

It will be noted from viewing FIG. 4, that the flanges 44, 45 in the ends of the plate member 53, when in their assembled position, form an additional pair of ribs on diametrically opposite sides of the roll. Therefore, the welded portion of the roll serves as additional aggressive means which operate in the form of the ribs 42, 43 to aggressively engage the stalks. In assembling the pair of rolls 16, 17, the flanges 44, 45 and the ends of the plate 53 will be positioned between corrugations of the adjacent roll. This, of course, permits the roll to be positioned closer than would otherwise be permitted.

There are several structural advantages to fabricating the roll as is done in the present invention. The plate 53 and the corrugations 42, 43 provide strength longitudinally to the roll sections 40, 41. The slots 30, 31 which hold the plate 53 and the rivets 56, 57 operate to provide a rigid connection between the shafts 11, 20 and 14, 21. In effect, therefore, the fabricated roll takes on a rigidity which heretofore has been generally inherent only in the type of roll in which there is a solid core or an inner tubular or shaft member.

While only one form of the present invention has been shown, it should be recognized that other forms and variations will occur to those skilled in the art. Therefore, it is to be understood that while the drawings and description indicate in detail the exact construction of the harvester rolls, such was done only for purposes of clearly and concisely illustrating the principles of the invention and it was not the intention to so limit or narrow the invention beyond the broad general principles herein claimed.

What is claimed is:

1. A harvesting device composed of a pair of harvesting rolls, each of the rolls comprising: a pair of support shafts spaced apart and coextensive axially, said shafts having at their adjacent ends diametrical slots; an elongated plate member disposed in a plane containing the axis of the shafts and having opposite ends inserted in the respective diametrical slots to thereby bridge the space between the shafts and further having diametrical opposite longitudinal edges, a pair of elongated shell members substantially of the length and positioned on opposite sides of the plate member, each of said shell members having longitudinal corrugations and opposite edge flanges lying adjacent to the plate member and terminating substantially at the respective opposite edges of the plate member; an end plug member rigid with one of the support shafts having axially extending inserts adapted for disposition between the corrugations of said shell members and the flanges; and means rigidly fixing said flanges to the plate member.

2. A harvesting device composed of a pair of harvesting rolls, each of the rolls comprising: a pair of support shafts spaced apart and coextensive axially, said shafts having at their adjacent ends diametrical slots; an elongated plate member disposed in a plane containing the axis of the shafts and having opposite ends inserted in the respective diametrical slots to thereby bridge the space between the shafts and further having diametrical opposite longitudinal edges; a pair of elongated shell members substantially of the length and positioned on opposite sides of the plate member, each of said shell members having longitudinal corrugations and opposite edge flanges lying adjacent to the plate member and terminating substantially at the respective opposite edges of the plate member; means rigidly fixing said plate member in said slots; and means rigidly fixing said flanges to the plate member.

3. The invention defined in claim 2 in which the outer flanged edges of the shell members and the outer edges of the plate member form additional longitudinal ribs on opposite sides of the roll generally complementary to the longitudinal ribs formed by the corrugations.

4. The invention defined in claim 3 further characterized by the ribs formed by the plate portion and the outer flange portions having outer square corners and the ribs of the corrugated shell members having rounded corners; and means for mounting the roll on a harvester is provided, said means being adapted to position the roll in side by side opposed relation to an adjacent similar roll to effect disposition of the square-cornered rib of the roll between a pair of rounded ribs formed by the corrugations of the adjacent roll.

5. A harvesting device composed of a pair of harvesting rolls, disposed in side opposed relation, each of the rolls comprising: a pair of support shafts spaced apart and coextensive axially; an elongated plate member disposed in a plane containing the axis of the shafts and having opposite ends connected to the shafts, said plate member further having diametrical opposite longitudinal edges, a pair of elongated shell members substantially of the length and positioned on opposite sides of the plate member, each of said shell members having longitudinal corrugations and opposite edge flanges lying adjacent to the plate member and terminating substantially at the respective opposite edges of the plate member; an end plug member rigid with one of the support shafts having axially extending inserts adapted for disposition between the corrugation of said shell members and the flanges; and means rigidly fixing said flanges to the plate member.

References Cited in the file of this patent

UNITED STATES PATENTS

| 119,235 | McDonald | Sept. 26, 1871 |
| 665,806 | Smith | Jan. 8, 1901 |
| 2,634,169 | Martin | Apr. 7, 1953 |